US008457993B1

(12) United States Patent  
Leve et al.

(10) Patent No.: US 8,457,993 B1
(45) Date of Patent: Jun. 4, 2013

(54) INSURANCE FOR A SAFE DEPOSIT BOX

(75) Inventors: Norman Leve, St. Louis, MO (US); Clifford Leve, St. Louis, MO (US)

(73) Assignee: Safe Deposit Box Insurance Coverage, LLC, Elgin, IL (US)

( * ) Notice: Subject to any disclaimer, the term of this patent is extended or adjusted under 35 U.S.C. 154(b) by 0 days.

(21) Appl. No.: 13/027,588

(22) Filed: Feb. 15, 2011

Related U.S. Application Data

(63) Continuation of application No. 12/661,182, filed on Mar. 11, 2010, now abandoned.

(51) Int. Cl.
*G06Q 40/00* (2006.01)

(52) U.S. Cl.
USPC .......................................................... 705/4

(58) Field of Classification Search
USPC .......................................................... 705/4
See application file for complete search history.

(56) References Cited

U.S. PATENT DOCUMENTS

| | | | |
|---|---|---|---|
| 7,441,277 B2 | 10/2008 | Burges et al. | |
| 7,814,008 B2 | 10/2010 | Choudhuri et al. | |
| 7,840,423 B2 | 11/2010 | Sato | |
| 7,840,468 B2 | 11/2010 | Coughlan et al. | |
| 7,844,478 B1 | 11/2010 | Smith | |
| 7,848,938 B2 | 12/2010 | Wahlbin et al. | |
| 7,848,939 B1 | 12/2010 | Martin | |
| 2004/0143464 A1* | 7/2004 | Houle et al. | 705/4 |
| 2010/0268554 A1 | 10/2010 | Hoffman | |

OTHER PUBLICATIONS

Dailey, The Pantera Place, Oct. 17, 2007, Internet Archive Wayback Machine.*
Safestor.com, Safestor Webpage, Oct. 19, 2006-Jan. 3, 2007, Internet Archive Wayback Machine.*
"N.Y. vault users sue bank over valuables", Reuters News Service, Dec. 8, 2001, 1 page.
Blau et al., "Chimney-Creep Heist—Bank Safe-Deposit Swipers Use Rooftop Ruse", New York Post, Feb. 24, 2009, downloaded from infoweb.newsbank.com/iw-search/we/InfoWeb on Sep. 1, 2011, 2 pages.
Buggs, "Safe-deposit box proves not so safe", Houston Chronicle, Jul. 2, 2001, downloaded from www.chron.com/default/article/Buggs-Safe-deposit-box-proves-not-so-safe-2020653 on Sep. 1, 2011, 4 pages.
Holleman, "Jury Sides With Pair Who Lost Rare Violin", St. Louis Post-Dispatch, Aug. 29, 1995, 1 page.
Johnson, "1972 United California Bank Robbery, Laguna Niguel", Orange County Memories, Mar. 28, 2006, downloaded from www.octhen.com/2006/03/1972-united-california-bank-robbery.htm on Oct. 25, 2011, 7 pages.

(Continued)

*Primary Examiner* — Lindsay M Maguire
*Assistant Examiner* — Cho Kwong
(74) *Attorney, Agent, or Firm* — Thompson Coburn LLP

(57) ABSTRACT

A system and method for insuring a safe deposit box is disclosed. The system for insuring a safe deposit box comprises a computer system capable of being assessed over an Internet, the computer system capable of providing various screens and for receiving entered information relating to a safe deposit box to be insured, and determining a premium to be paid for the insurance for a safe deposit box. The method for insuring a safe deposit box comprises the steps of renting a safe deposit box and purchasing insurance for insuring the safe deposit box.

68 Claims, 6 Drawing Sheets

OTHER PUBLICATIONS

McGuinn, ""Hurricane Katrina"—Flooded Vault Planning is the Key!", BankersOnline.com, Oct. 24, 2005, downloaded from www.bankersonline.com/cgi-bin/printview/printview.pl on Sep. 1, 2011, 3 pages.

McMaster, "Tunnel-Drilling Gang Fails to Rob Paris Bank", Newser, Apr. 5, 2010, 1 page.

Possley, "Bank Job a Perfect Crime-almost", Chicago Tribune, Mar. 4, 1985, downloaded from articles.chicagotribune.com/1985-03-04/news/8501120674_1_safe-deposit-vault-feder on Sep. 1, 2011, 4 pages.

Ridge, "Not-So-Safe Deposit Boxes", The Wall Street Journal, 2001, 2 pages.

Samuel, "Paris robbers tunnel into bank and steal from 200 vaults", Telegraph, Mar. 30, 2010, downloaded from www.telegraph.co.uk/news/7538617/Paris-robbers-tunnel-into-bank-and-steal-from-2 on Sep. 1, 2011, 2 pages.

"United California Bank robbery", downloaded from en.wikipedia.org/wiki/United_California_Bank_robbery on Oct. 25, 2011, 2 pages.

U.S. Appl. No. 12/661,182, filed Mar. 11, 2010 (Leve et al.).

"Safestor Insurance", downloaded from web.archive.org on Feb. 13, 2012 as archived web pages from Oct. 19, 2006 through May 13, 2008, 5 pages.

"Safestor Insurance | Frequently Asked Questions", downloaded from web.archive.org on Feb. 13, 2012 as archived web pages from Oct. 28, 2006, 3 pages.

\* cited by examiner

INSURANCE FOR A SAFE DEPOSIT BOX

CROSS REFERENCE AND PRIORITY CLAIM TO RELATED APPLICATION

This application is a continuation of U.S. patent application Ser. No. 12/661,182, filed Mar. 11, 2010, the entire disclosure of which is incorporated herein by reference.

BACKGROUND

This invention relates to a system and method for insuring safe deposit boxes and more particularly to a system and method for insuring a safe deposit box without having to itemize the contents of a safe deposit box.

Safe deposit boxes are found at various institutions such as banks, savings and loans, and credit unions for the deposit of important documents and items for safekeeping. For example, gold, coins, jewelry, silverware, paintings, stock certificates, and legal documents may be stored in safe deposit boxes. Although safe deposit boxes are assumed to be secure the contents have been robbed, destroyed, or lost through various means. For example, a theft may occur by a break in into the vault. Also, flooding, fire, and earthquake may occur in which the contents of the box are destroyed because such contents are not waterproof. An earthquake can also destroy the box and its contents. Therefore, it would be desirable to be able to insure against the theft or destruction or other specific perils of a safe deposit box.

The present disclosure is designed to obviate and overcome many of the disadvantages and shortcomings associated with safe guarding against the theft or destruction of a safe deposit box. In particular, the present disclosure is a system and method for insuring a safe deposit box from an insurable event. Moreover, the system and method of the present disclosure can be employed to insure the safe deposit box without having to itemize, disclose, appraise, or list the contents of the safe deposit box which overcomes many of the problems associated with existing methods that insure only the contents. Further, some advantages are there is no need to itemize the contents of the safe deposit box, there is no need to have expensive appraisals, there is no need to reappraise as values of the items change, and there is no need to update the contents of the safe deposit box. Another advantage is that items may be removed from the safe deposit box and the insurance policy will still pay for coverage in the event of an insurable event such as when the box is burglarized. Insurance for a safe deposit box is inexpensive for the consumer due to there being no appraisals and the fact that the insurance covers the safe deposit box without regard to the contents thus making underwriting much simpler and less expensive. Since there is less paperwork and no appraisals for an underwriter to review this results in lower premiums being charged.

The insurance policy is easy to issue because no reviews are required. All that consumers need to do is fill out a simple form stating bank location, box number, and the dollar amount of insurance requested. The consumer is also afforded complete privacy because the contents of the safe deposit box do not have to be disclosed or itemized. Obtaining insurance for a safe deposit box is a streamlined and easy process.

SUMMARY

In one form of the present disclosure, a method for insuring a safe deposit box comprises the steps of renting a safe deposit box and purchasing insurance for insuring the safe deposit box.

In another form of the present disclosure, a system for purchasing insurance for a safe deposit box comprises a computer system capable of being assessed over an Internet, the computer system capable of providing various screens and for receiving entered information relating to a safe deposit box to be insured, and for determining a premium to be paid for the insurance for a safe deposit box.

In still another form of the present disclosure, a method for purchasing insurance for a safe deposit box over a computer network comprising the steps of: accessing a web site for purchasing insurance for a safe deposit box; entering information relating to a safe deposit box to be insured; reviewing information relating to a premium to be paid for the insurance for a safe deposit box; and paying the premium.

In light of the foregoing comments, it will be recognized that the present disclosure provides a method and a system for insuring a safe deposit box. A method for insuring a plurality of safe deposit boxes in a single location is also disclosed.

Further, the present disclosure provides a system and a method for determining a premium for insurance for a safety deposit box.

These and other advantages of the present disclosure will become apparent after considering the following detailed specification in conjunction with the accompanying drawings, wherein:

DETAILED DESCRIPTION OF THE PREFERRED EMBODIMENTS

Figure 1:
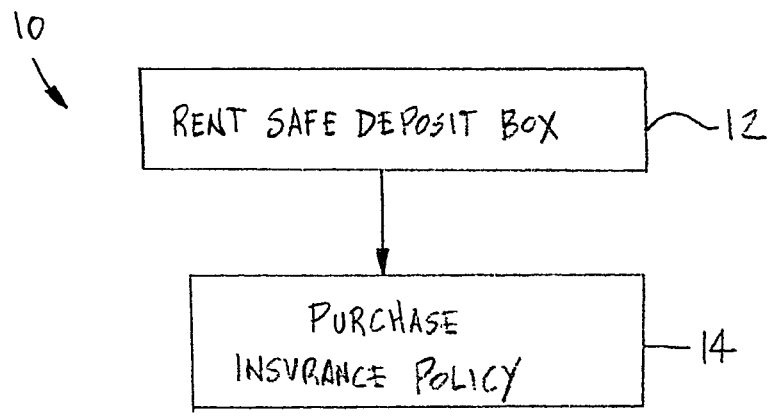
FIG. 1 is a flow chart diagram illustrating a preferred operation of the method for insuring a safe deposit box according to the present disclosure.

Referring now to the drawings, wherein like numbers refer to like items, number 10 identifies a preferred method for insuring a safe deposit box according to the present disclosure. With reference now to FIG. 1, the method 10 is shown to comprise a first step 12 in which an entity or individual rents a safe deposit box from another company or entity such as a bank, savings and loan, credit union, investment company, or other company that provides a safe deposit box service. Once a safe deposit box is rented, a second step 14 of the method 10 comprises the safe deposit box renter to purchase an insurance policy against theft or destruction of the safe deposit box. The insurance policy protects against any theft of the safe deposit box or destruction of the safe deposit box, such as by fire, flood, earthquake, or other disaster. In essence, the insurance policy is insuring against the event of the safe deposit box being broken into or destroyed without regard to the contents of the safe deposit box. This allows for the premium to be charged for the insurance policy to be less expensive because there is no need for appraisals for the contents of the safe deposit box or complicated forms to be updated as to the contents of the safe deposit box. Further, there is complete privacy for the renter because there is no need to disclose the contents of the safe deposit box.

Figure 2:
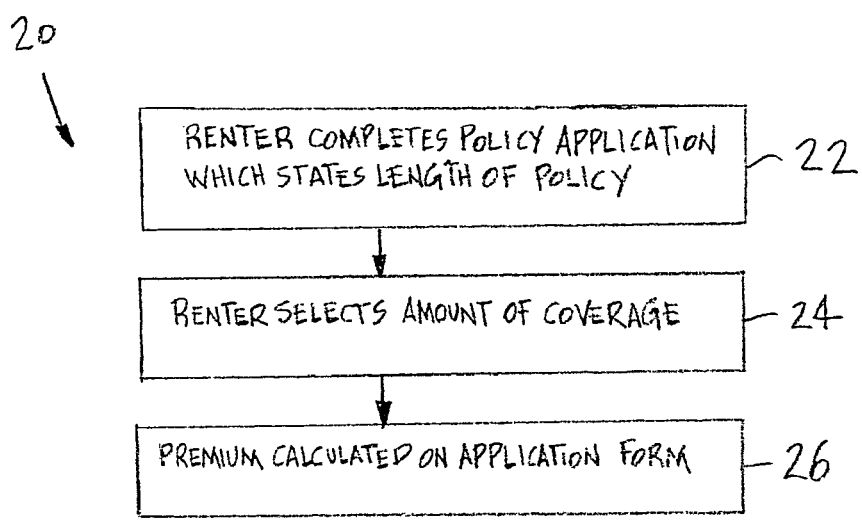
FIG. 2 is a flow chart diagram illustrating a method for selecting insurance policy requirements.

FIG. 2 shows a process or method 20 for the renter to use in selecting policy requirements for purchasing the insurance policy. The policy requirements include various parameters that may be selected prior to purchasing an insurance policy. In a first step 22, a renter completes a policy application which states the length or term of the insurance policy. For example, the renter may want to insure a safe deposit box for a term of one year. Once the application is completed, the renter selects the amount of coverage as shown in a second step 24. The renter may select various dollar amounts such as by way of example only $50,000, $100,000, or $1,000,000. In a next step, step 26, a premium amount is calculated or presented on the application form with the premium amount being based upon parameters such as policy length and policy amount. Other parameters may be taken into consideration for the calculation of the premium amount. Such other parameters may include the safety record of the entity in which the safe deposit box is, the size of the safe deposit box, the location of the entity of the safe deposit box, geographical records such as whether the safe deposit box is located near an earthquake fault line or nearness to a river that is prone to flooding. These listed parameters are for purposes of example only and are not inclusive. The policy may include a deductible amount. It is also possible and contemplated that the renter is presented with a table of possible amounts of coverage and a corresponding premium. For example, to insure an amount of $250,000 would cost $200 for one year.

Figure 3:
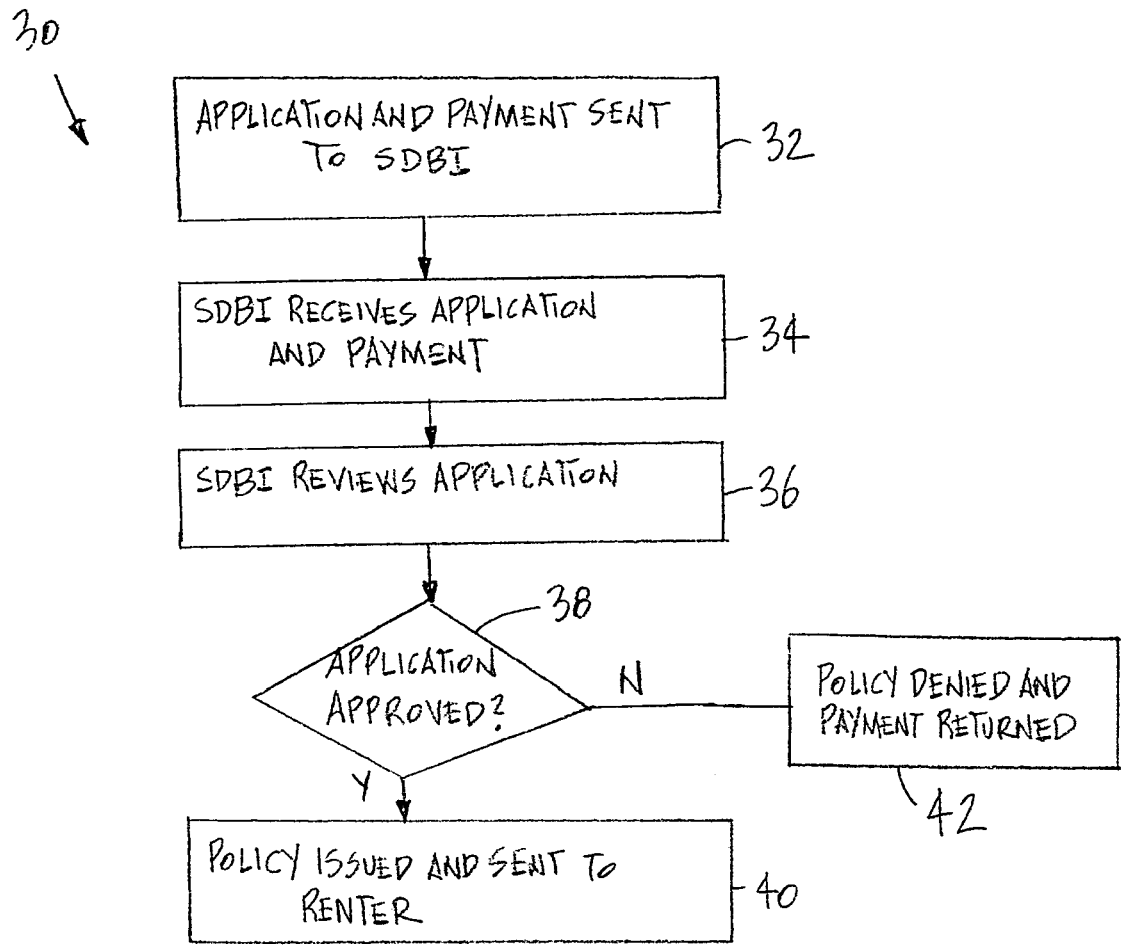
FIG. 3 is a flow chart diagram illustrating a method for accepting coverage of an insurance policy for a safe deposit box.

With reference now to FIG. 3, a flowchart illustrates a process 30 for accepting coverage of an insurance policy for a safe deposit box by a safe deposit box insurance company (SDBI). First, in a step 32, the renter completes the application and submits the premium payment to the SDBI. In a next step 34, the SDBI receives the application and the premium payment. The SDBI then reviews the application as is indicated in a step 36. The application is reviewed to determined if the policy will be written or approved by the SDBI. This is shown in a step 38. If the policy is approved then the policy is issued and sent to the renter as is illustrated in a step 40. If in the step 38 the policy is rejected for some reason then the policy is denied and the premium payment is returned to the renter as is depicted in a step 42. Some reasons why the policy may be denied may be the high probability of an earthquake occurring in the location of the safe deposit box or a record of poor security at the location of the safe deposit box. Other factors may be considered in accepting or rejecting an application.

Figure 4:
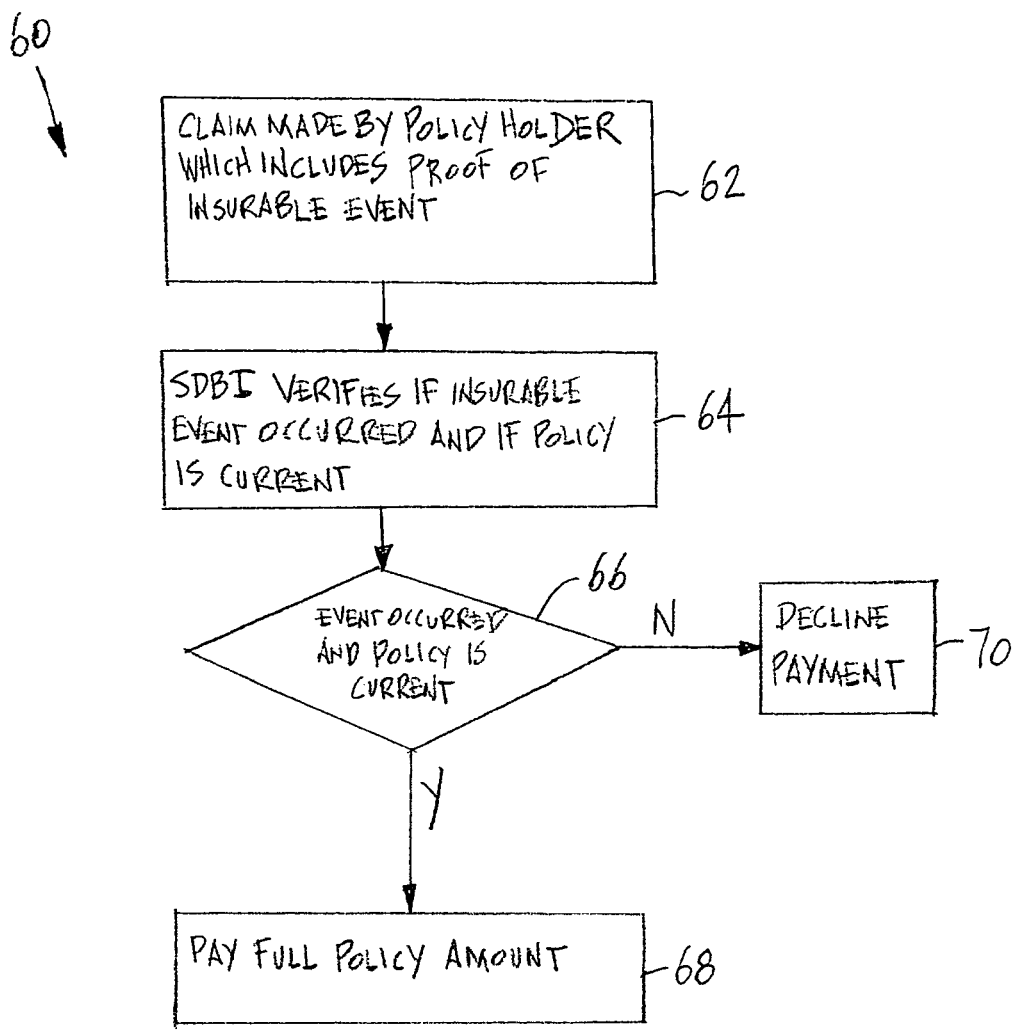
FIG. 4 is a flow chart diagram illustrating a method for determining whether a claim may be made against an insurance policy for insuring a safe deposit box.

FIG. 4 illustrates a flow chart of a method 60 for determining whether a claim may be made against an insurance policy for insuring a safe deposit box. The method 60 commences with a first step 62 in which the renter or policy holder makes a claim against the policy which includes proof of an insurable event. An insurable event may be by way of example only a theft, an earthquake that damages the contents of the safe deposit box, or a flood that damages the contents of the safe deposit box. A renter provides proof of an insurable event from the entity in which the safe deposit box is located. For example, a bank may provide a declaration that the safe deposit box was broken into, or that a flood occurred and the contents of the safe deposit box were destroyed, or that an earthquake occurred and the contents of the safe deposit box were destroyed. Other proof may be required such as proof that a safe deposit box was rented by the renter and identification of the renter. In a next step 64, the SDBI verifies that an insurable event has occurred and if the policy is current. If it is determined in a next step 66 that both an insurable event has occurred and the policy is current then in a step 68 the renter is paid the full policy amount. However, if in the step 66 it is determined that an insurable event has not occurred or that the policy is not current then in a step 70 the payment is declined.

Figure 5:
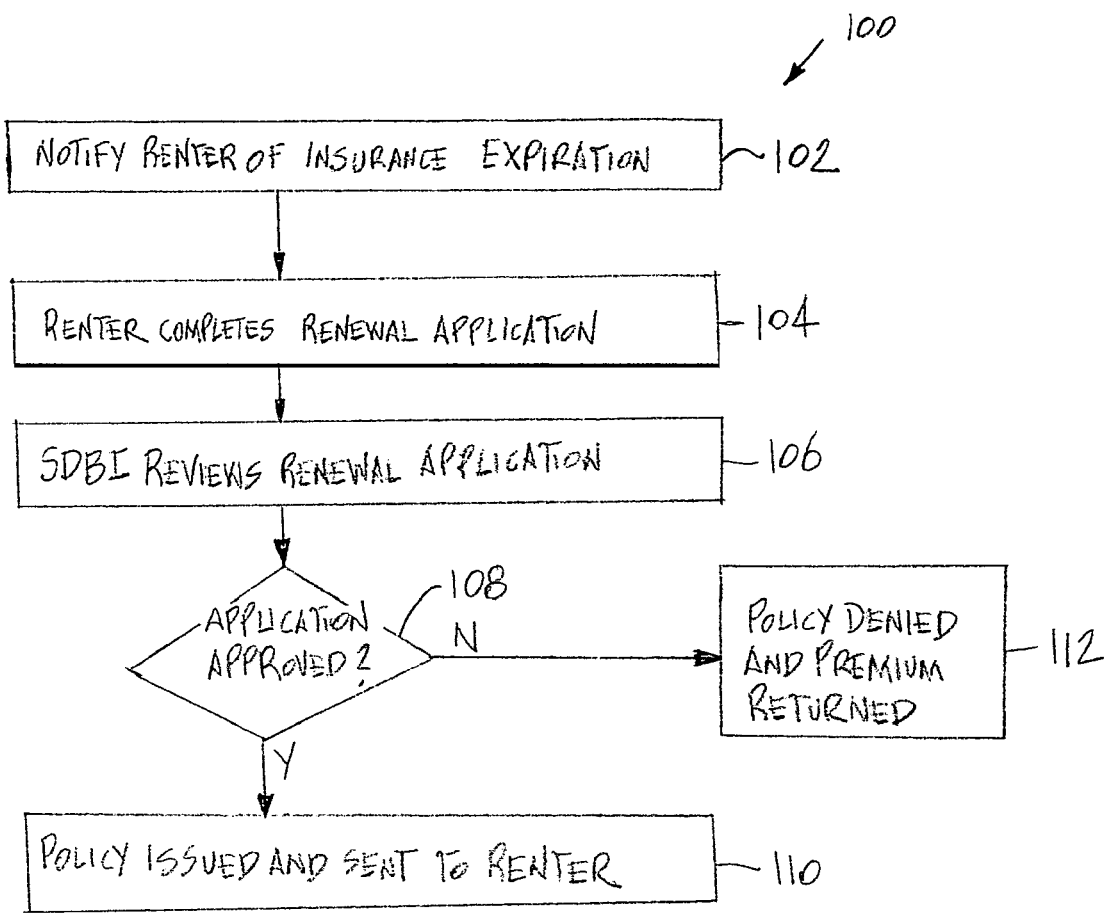
FIG. 5 is a flow chart diagram illustrating a method for renewing an insurance policy for insuring a safe deposit box.

FIG. 5 shows a flow chart of a process 100 for renewing an insurance policy for insuring a safe deposit box. In a first step 102 the renter is notified of the expiration of the insurance policy. In a next step 104 the renter completes a renewal application and submits the renewal application and the premium to the SDBI. By way of example only, the renewal application may include the selection of parameters such as a new or same policy term as the original policy or a new or same amount of coverage as the original policy. In a step 106, the SDBI receives the renewal application and the premium. The SDBI then determines in a step 108 whether the renewal application will be approved. If the renewal application is approved then the SDBI issues the policy and the policy is sent to the renter, as identified in a step 110. However, if in the step 108 the SDBI determines that the policy cannot be written then the SDBI denies the policy and returns the premium to the renter, as is depicted in a step 112.

Figure 6:
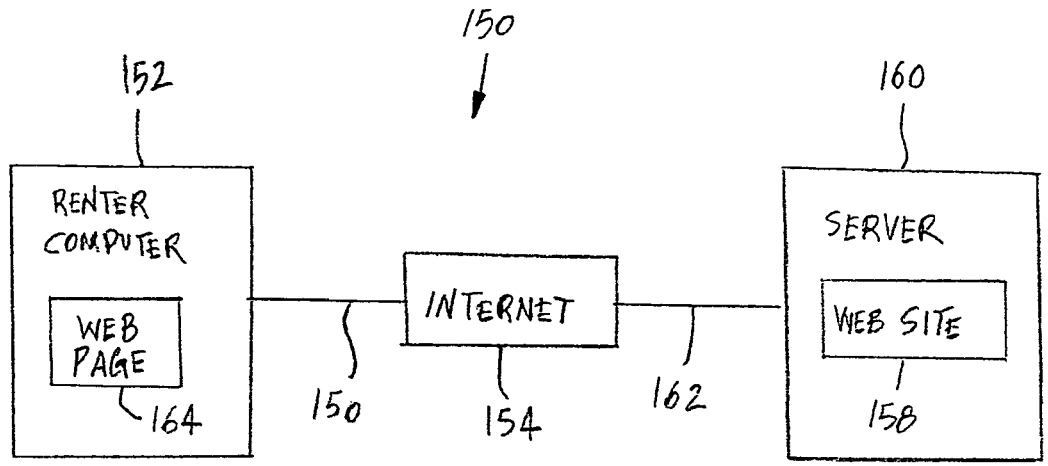
FIG. 6 is a block diagram of a system for insuring a safe deposit box constructed according to the present invention.

A system for insuring a safe deposit box 150 is illustrated in FIG. 6. The system 150 is shown comprising a renter or user computer system 152 that is capable of being connected to the Internet 154 by a communications connection 156 such as a telephone line, cable, ISDN lines, fiber optic lines, wireless connections, satellites, or other suitable means of connection. Through use of the connection 156 to the Internet 154, the computer 152 is capable of accessing a web site 158 on a computer system or a server 160 over a connection 162. The web site 158 may be a web site of an insurance company. As described for the connection 156, the connection 162 may include a telephone line, cable, ISDN lines, fiber optic lines, wireless connections, satellites, or other means of connection. The server 160 is capable of transmitting to the user computer 152 one or more web pages 164 for viewing by a renter of the user computer 152.

The user computer 152 is allowed access to the server 160 through use of a commonly available web browser or similar software package or application. The server 160 is capable of hosting the web site 158 which presents various screens or web pages 164 to the user computer 152. A renter operating the user computer 152 is able to interact with the web site 158 being hosted by the server 160. In particular, a renter may be presented with various screens or web pages 164 with such web pages 164 presenting information concerning the purchasing of insurance for insuring a safe deposit box. Further, the web pages 164 may have other information such as selecting a length of a policy term, an amount of coverage, a deductible amount, and entering of information concerning the location of a safe deposit box to be insured.

Figure 7:
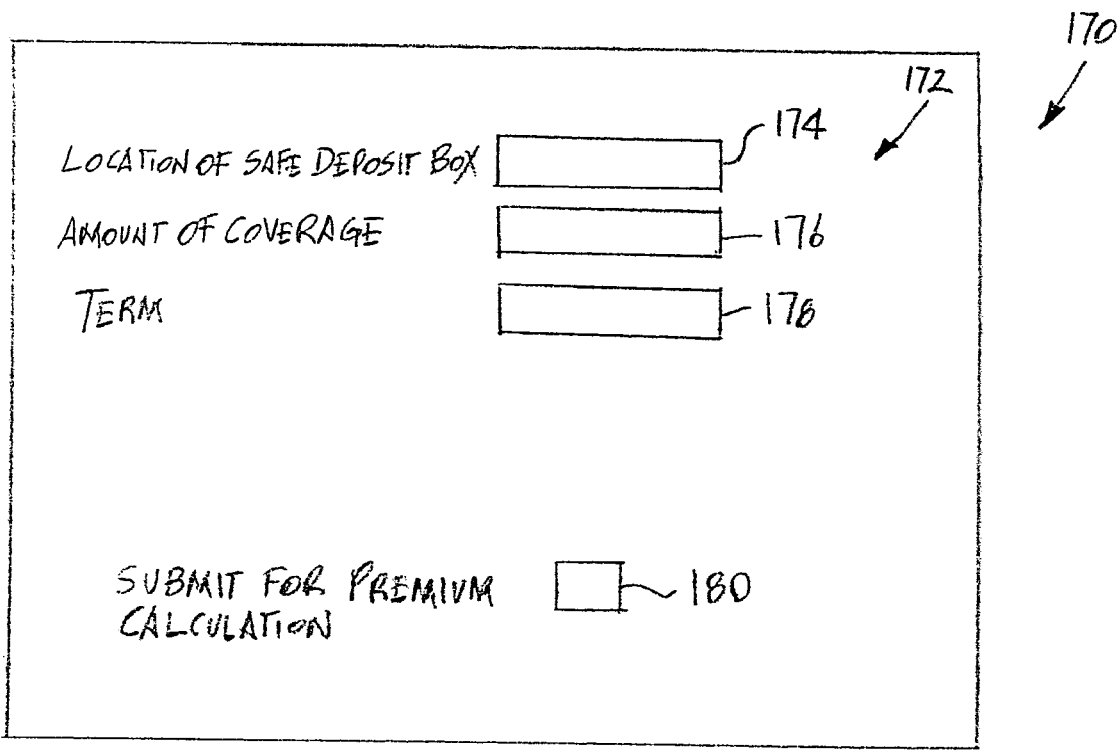
FIG. 7 is an illustration of a screen that may be presented during use of the system for insuring a safe deposit box to enter insurance parameters.

The user may be presented with a web page or screen 170 as illustrated in FIG. 7. As shown, underwriting information or insurance parameters 172 are presented for selection or entry by the renter of a safe deposit box. The renter is requested to enter information concerning the location of the safe deposit box to be insured in a box 174. The amount of coverage desired is entered in a box 176. For example, the renter may select from a listing of insurable amounts or may input a specific amount to be insured. The term of the policy is selected and entered in a box 178. The renter can determine the length of the term of the policy. Once the renter has entered the insurance parameters 172, a button 180 may be selected to transmit the insurance parameters 172 to the server 160 in order to determine or calculate a premium for insuring the safe deposit box identified in the box 174.

Figure 8:
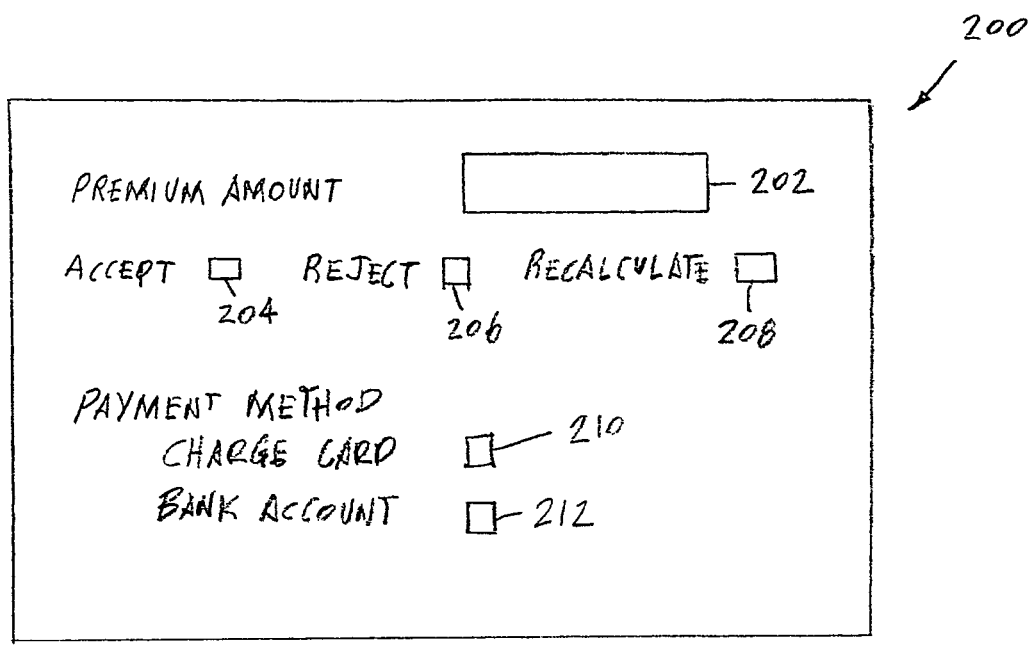
FIG. 8 is an illustration of a screen that may be presented during use of the system for insuring a safe deposit box.

Once the server 160 receives the insurance parameters 172, a premium is calculated. The premium amount is then sent to the renter or user computer 152 to be displayed as a screen or a web page 164. FIG. 8 depicts a web page 200 that may be presented on a display associated with the user computer 152. The web page 200 has a box 202 in which the premium amount is displayed for review by the renter. The renter may accept the premium amount by selecting a button 204, reject the premium amount by selecting a button 206, or recalculate a premium amount by selecting a button 208. If the button 204 is selected, the renter may be requested to indicate a payment method for the premium amount. If the premium is to be paid by a credit card then a box 210 is selected and the renter is taken to a new web page to enter further information concerning the credit card. If the premium is to be paid by a bank account then a box 212 is selected and a new web page is presented for entry of bank account information. Other methods of payment, such as cash, check, invoice, or being billed are contemplated and possible and such methods may be incorporated into the web page 200. If the renter decides that the premium amount is too high and insuring the safe deposit box is no longer desired the box 206 is selected and the renter may be taken to a home page of the server 160. On the other hand, if the renter selects the box 208, the renter will be presented the web page 170 again to enter insurance parameters 172 in an attempt to recalculate the premium amount. For example, the premium amount presented in the box 202 may be more than the renter wants to pay. In order to reduce the premium amount the renter selects the box 208 and the web page 170 is presented for entry of other amounts. In this manner, the premium amount is recalculated and the recalculated amount for the premium may be low enough that the renter now selects the accept box 204. As can be appreciated, several other web pages may be presented to the renter. By way of example, web pages may be presented that include the conditions and terms of the insurance policy and payment confirmation.

Although not shown, the computer system 152 may include peripheral devices such as a keyboard, a speaker, a display, a printer, a modem, a network card, and any other suitable device. The computer system 152 may be a personal computer having a microprocessor, memory, a hard drive having stored thereon an operating system and other software, and input devices such as a mouse, a keyboard, a CD-ROM drive, a flash drive, or a floppy disk drive. The computer system 152 may also be a PDA type device, a cell phone, or other hand held type computer device that allows for receiving and transmitting information or data. Further, the server 160 may take on various known forms for a server including a personal computer, a computer system, or a network. Also, although the Internet 154 is disclosed, it is also possible that the system 150 be located on a LAN or other closed network system. For example, a kiosk type system may be provided at the location of the safe deposit box for a renter to purchase safe deposit box insurance as part of the renting of the safe deposit box.

Although the present system and method have been described by use of electronic means, it is also possible that an agent, a broker, or other salesperson may provide the policy to a renter. For example, an agent or an employee of a bank where the safe deposit box is located may provide a quote for coverage to a renter of a safe deposit box. The renter may review the quote and then determine whether to insure the safe deposit box. In this manner, the renter does not directly interact with the system and relies on the agent for information and the premium quote. Also, the agent or the system may already have predetermined premiums or policies for safe deposit boxes located at a particular branch or location. The renter may select the insurance policy and premium from a listing of the predetermined premiums or polices. Other methods and manners of selling insurance for a safe deposit box are contemplated such as by direct mail, television or radio advertisements, newspapers, magazines, or through organizations such as AARP.

As can be appreciated, insurance for a safe deposit box has many advantages. Some advantages are there is no need to itemize the contents of the safe deposit box, there is no need to have expensive appraisals, there is no need to reappraise as values of the items change, and there is no need to update the contents of the safe deposit box. Another advantage is that items may be removed from the safe deposit box and the insurance policy will still pay for coverage in the event of an insurable event such as when the box is burglarized. Insurance for a safe deposit box is inexpensive for the consumer due to there being no appraisals and the fact that the insurance covers the safe deposit box without regard to the contents thus making underwriting much simpler and less expensive. Since there is less paperwork and no appraisals for an underwriter to review this results in lower premiums being charged. The insurance policy is easy to issue because no reviews are required. All that consumers need to do is fill out a simple form stating bank location, box number, and the dollar amount of insurance requested. The consumer is also afforded complete privacy because the contents of the safe deposit box do not have to be disclosed or itemized. The process of obtaining insurance for a safe deposit box is streamlined.

It is also possible that a master insurance policy may be provided, written, or issued to a financial institution or other entity that offer safe deposit boxes. In this manner the entity could purchase a master insurance policy from an SDBI company in which each safe deposit box located at one or more locations would be insured to a base or specific amount. For example, a bank could purchase a master policy in which each safe deposit box at one or more locations would be insured for $10,000, or some other negotiated amount. The renter of the safe deposit box could stay at this base amount or would be offered the opportunity to purchase more insurance for the safe deposit box. In this case, the renter would fill out an application as has been described previously and then submit the application for acceptance of the increased amount of insurance. The price for insuring the safe deposit box could be incorporated into the annual fee charged for the safe deposit box or the bank could absorb the cost of the premiums for the insurance. Because a bank is purchasing a large policy this could reduce the costs, overhead, and underwriting to the safe deposit box insurance company. The bank could advertise that each safe deposit box is insured to a specific limit to be able to generate more rentals of safe deposit boxes.

From all that has been said, it will be clear that there has thus been shown and described herein a system and method for insuring a safe deposit box which fulfills the various advantages sought therefore. It will become apparent to those skilled in the art, however, that many changes, modifications, variations, and other uses and applications of the subject system and method for insuring a safe deposit box are possible and contemplated. All changes, modifications, variations, and other uses and applications which do not depart from the spirit and scope of the disclosure are deemed to be covered by the disclosure, which is limited only by the claims which follow.

What is claimed is:

1. A method for providing safe deposit box insurance, the method comprising:
   receiving information corresponding to a request regarding safe deposit box insurance, the received information comprising (1) a monetary amount of insurance coverage desired by a customer for insuring content within a safe deposit box, and (2) a location corresponding to the safe deposit box, wherein the received information does not identify specific content for storage in the safe deposit box;
   responsive to the received information, determining, by a computer system, a premium for an insurance policy for the customer with respect to the safe deposit box without requiring an appraisal of any content stored in the safe deposit box, the computer system in communication with a remote computer via a network;
   communicating data to the remote computer for populating a screen displayed on the remote computer, the communicated data being representative of the insurance policy and including the determined premium for the insurance policy;
   receiving input from the remote computer corresponding to a purchase request for the insurance policy; and
   responsive to the received purchase request input, insuring content within the safe deposit box against an insurable event for the monetary amount by issuing the insurance policy to the customer, the insurance policy entitling the customer to receive the monetary amount in response to a proven claim that the insurable event has occurred without requiring an appraisal of any content stored in the safe deposit box.

2. The method of claim 1 wherein all of the method steps are performed by the computer system.

3. The method of claim 2 wherein the insurable event comprises at least one member of the group consisting of a theft, a fire, a flood, and an earthquake.

4. The method of claim 2 wherein the premium determining step further comprises the computer system determining the premium for the insurance policy without requiring the customer to disclose or itemize any content for storage in the safe deposit box.

5. The method of claim 4 wherein the computer system comprises a server, the server hosting a website, the website comprising a web page, the server providing the web page to the remote computer for display thereon, the provided web page serving as the screen through which the communicated data is displayed on the remote computer.

6. The method of claim 4 wherein the computer system comprises a server, the server hosting a website, the website comprising at least one web page, the method further comprising the server providing the at least one web page to the remote computer for display thereon, the provided at least one web page being configured to solicit information from the customer regarding a desired term of insurance coverage for insuring content within the safe deposit box, wherein the received information further comprises data representative of the term, and wherein the insurance policy is further configured with the term.

7. The method of claim 6 wherein the provided at least one web page is further configured to solicit information from the customer regarding a location for an entity in which the safe deposit box resides.

8. The method of claim 7 wherein the provided at least one web page is further configured to solicit information from the customer regarding an identifier for the safe deposit box within the entity in which the safe deposit box resides, and wherein the received information further comprises data representative of the identifier.

9. The method of claim 8 wherein the premium determining step comprises the computer system determining the premium based on a plurality of parameters, the parameters comprising at least two selected from the group consisting of: (1) data representative of the monetary amount, (2) data representative of the term, (3) safety data corresponding to the entity in which the safe deposit box resides, (4) data representative of a size for the safe deposit box, (5) the entity location data, and (6) geographical data associated with the entity location, wherein the geographical data is indicative of a risk of a natural disaster at the entity location.

10. The method of claim 8 wherein the premium determining step comprises the computer system determining the premium based on a plurality of parameters, the parameters comprising at least three selected from the group consisting of: (1) data representative of the monetary amount, (2) data representative of the term, (3) safety data corresponding to the entity in which the safe deposit box resides, (4) data representative of a size for the safe deposit box, (5) the entity location data, and (6) geographical data associated with the entity location, wherein the geographical data is indicative of a risk of a natural disaster at the entity location.

11. The method of claim 8 wherein the premium determining step comprises the computer system determining the premium based on a plurality of parameters, the parameters comprising at least four selected from the group consisting of: (1) data representative of the monetary amount, (2) data representative of the term, (3) safety data corresponding to the entity in which the safe deposit box resides, (4) data representative of a size for the safe deposit box, (5) the entity location data, and (6) geographical data associated with the entity location, wherein the geographical data is indicative of a risk of a natural disaster at the entity location.

12. The method of claim 8 wherein the premium determining step comprises the computer system determining the premium based on a plurality of parameters, the parameters comprising at least five selected from the group consisting of: (1) data representative of the monetary amount, (2) data representative of the term, (3) safety data corresponding to the entity in which the safe deposit box resides, (4) data representative of a size for the safe deposit box, (5) the entity location data, and (6) geographical data associated with the entity location, wherein the geographical data is indicative of a risk of a natural disaster at the entity location.

13. The method of claim 8 wherein the premium determining step comprises the computer system determining the premium based on a plurality of parameters, the parameters comprising: (1) data representative of the monetary amount, (2) data representative of the term, (3) safety data corresponding to the entity in which the safe deposit box resides, (4) data representative of a size for the safe deposit box, (5) the entity location data, and (6) geographical data associated with the entity location, wherein the geographical data is indicative of a risk of a natural disaster at the entity location.

14. The method of claim 8 wherein the received information further comprises data representative of a desired deductible amount for the insurance policy, and wherein the premium determining step comprises the computer system determining the premium based on a plurality of parameters, at least one of the parameters comprising the deductible amount data.

15. The method of claim 2 further comprising the computer system renewing the insurance policy in response to additional information received from the customer and without requiring the customer to obtain an appraisal of any content for storage in the safe deposit box.

16. The method of claim 2 further comprising the computer system renewing the insurance policy in response to additional information received from the customer and without requiring the customer to disclose or itemize any content for storage in the safe deposit box.

17. The method of claim 2 wherein the insurance policy comprises a master insurance policy that insures content within a plurality of safe deposit boxes.

18. The method of claim 17 wherein the issuing step comprises the computer system issuing the master insurance policy to an entity in which the safe deposit boxes reside.

19. The method of claim 18 further comprising offering a plurality of supplemental safe deposit box insurance policies to a plurality of customers who rent the safe deposit boxes from the entity such that the customers are not required to disclose or itemize the content for storage in the safe deposit boxes in order to obtain the supplemental safe deposit box insurance policies.

20. The method of claim 2 wherein the computer system comprises a server, the server hosting a website, the website comprising a plurality of web pages, the method further comprising the server providing at least one web page of the website to the remote computer for display thereon, the at least one web page comprising a plurality of fields for customer input, the fields comprising (1) a first field for receiving data representative of the location, (2) a second field for receiving data representative of the monetary amount, and (3) a third field for receiving data representative of a desired term of insurance coverage for insuring content within the safe deposit box, and wherein the information receiving step comprises the computer system receiving data representative of the location, the monetary amount, and the term via the fields of the at least one web page.

21. The method of claim 20 wherein the premium determining step comprises the computer system determining a premium for the insurance policy based on a plurality of parameters, the parameters being independent of any content for storage in the safe deposit box, and the parameters comprising at least two selected from the group consisting of: (1) data representative of the monetary amount, (2) data representative of the term, (3) safety data corresponding to an entity in which the safe deposit box resides, (4) data representative of a size for the safe deposit box, (5) data representative of the location, and (6) geographical data associated with the location, wherein the geographical data is indicative of a risk of a natural disaster at the location.

22. The method of claim 20 further comprising the computer system determining whether to issue the insurance policy based on the received information, and wherein the computer system conditions the insurance policy issuing step on the computer system determining that the insurance policy is to be issued.

23. The method of claim 2 wherein the computer system comprises a server, the server hosting a website, the website comprising a plurality of web pages, the method further comprising the server providing a web page to the remote computer for display thereon, the provided web page providing a list of safe deposit box insurance policy options to the customer, and wherein the receiving step comprises the server receiving a selection from the list by the customer, the selection comprising the received information.

24. The method of claim 23 further comprising the computer system determining a premium for each of a plurality of safe deposit box insurance policy options, and wherein the generated list displays the determined premium amounts for the safe deposit box insurance policy options.

25. The method of claim 2 further comprising:
the computer system receiving a claim against the insurance policy;
the computer system determining whether an insurable event under the insurance policy has occurred with respect to the safe deposit box;
the computer system determining whether the customer has paid the all premiums due under the insurance policy; and
in response to a determination that (1) an insurable event under the insurance policy has occurred with respect to the safe deposit box, and (2) the customer has paid the all premiums due under the insurance policy, the computer system determining that the customer is to receive the monetary amount as a claim payment in accordance with the insurance policy, wherein the payment determining step is performed without requiring an appraisal of any content stored in the safe deposit box.

26. The method of claim 25 wherein the insurable event comprises at least one member of the group consisting of a fire, a flood, and an earthquake, and wherein the payment determining step is further performed without requiring the customer to itemize or disclose any content stored in the safe deposit box.

27. The method of claim 25 wherein the insurable event comprises a theft, and wherein the payment determining step is further performed without requiring the customer to itemize or disclose any content stored in the safe deposit box.

28. The method of claim 27 wherein the theft comprises a burglary or robbery.

29. The method of claim 25 further comprising the computer system receiving proof corresponding to the insurable event, and wherein the computer system performs the step of determining whether the insurable event under the safe deposit box insurance policy has occurred with respect to the safe deposit box based on the received proof.

30. The method of claim 20 further comprising the server providing another web page of the website to the remote computer for display thereon, the another web page serving as the screen through which the communicated data is displayed on the remote computer.

31. The method of claim 30 wherein the another web page comprises (1) a field that displays the determined premium, and (2) a field for the customer to input data indicative of an acceptance of the insurance policy corresponding to the determined premium.

32. The method of claim 31 wherein the another web page further comprises a field for the customer to indicate data relating to payment information.

33. The method of claim 31 further comprising:
the computer system receiving a claim against the insurance policy;
the computer system determining whether an insurable event under the insurance policy has occurred with respect to the safe deposit box;
the computer system determining whether the customer has paid the all premiums due under the insurance policy; and
in response to a determination that (1) an insurable event under the insurance policy has occurred with respect to the safe deposit box, and (2) the customer has paid the all premiums due under the insurance policy, the computer system determining that the customer is to receive the monetary amount as a claim payment in accordance with the insurance policy, wherein the payment determining step is performed without requiring an appraisal of any content stored in the safe deposit box.

34. The method of claim 33 wherein the insurable event comprises at least one member of the group consisting of a fire, a flood, and an earthquake, and wherein the payment determining step is further performed without requiring the customer to itemize or disclose any content stored in the safe deposit box.

35. The method of claim 33 wherein the insurable event comprises a theft, and wherein the payment determining step is further performed without requiring the customer to itemize or disclose any content stored in the safe deposit box.

36. The method of claim 33 further comprising the computer system receiving proof corresponding to the insurable event, and wherein the computer system performs the step of determining whether the insurable event under the safe deposit box insurance policy has occurred with respect to the safe deposit box based on the received proof.

37. The method of claim 25 wherein the payment determining step is further performed such that the customer is entitled to payment of the monetary amount under the insurance policy even if the customer may have removed the content from the safe deposit box prior to the insurable event occurrence.

38. An apparatus for providing safe deposit box insurance, the apparatus comprising:
a computer system comprising a server, the server for communicating with a remote computer via a network;
the server configured to (1) receive information corresponding to a request regarding safe deposit box insurance, the received information comprising (i) a monetary amount of insurance coverage desired by a customer for insuring content within a safe deposit box, and (ii) a location corresponding to the safe deposit box, wherein the received information does not identify specific content for storage in the safe deposit box, (2) responsive to the received information, determine a premium for an insurance policy for the customer with respect to the safe deposit box without requiring an appraisal of any content stored in the safe deposit box, (3) communicate data to the remote computer for populating a screen displayed on the remote computer, the communicated data being representative of the insurance policy and including the determined premium for the insurance policy, (4) receive input from the remote computer corresponding to a purchase request for the insurance policy, and (5) responsive to the received purchase request input, issue the insurance policy for the customer, the insurance policy being configured to insure content within the safe deposit box against an insurable event for the monetary amount such that that the insurance policy entitles the customer to receive the monetary amount in response to a proven claim that the insurable event has occurred without requiring an appraisal of any content stored in the safe deposit box.

39. The apparatus of claim 38 wherein the server is further configured to determine a premium for the insurance policy without requiring the customer to disclose or itemize any content for storage in the safe deposit box.

40. The apparatus of claim 38 wherein the server is further configured to determine a premium for the insurance policy based on a plurality of parameters, the parameters being independent of any content for storage in the safe deposit box, and the parameters comprising at least two selected from the group consisting of: (1) data representative of the monetary amount, (2) data representative of a term of insurance coverage for insuring content within the safe deposit box, (3) safety data corresponding to an entity in which the safe deposit box resides, (4) data representative of a size for the safe deposit box, (5) data representative of a location for the entity in which the safe deposit box resides, and (6) geographical data associated with the entity location, wherein the geographical data is indicative of a risk of a natural disaster at the entity location.

41. The apparatus of claim 38 wherein the server is further configured to host a website, the website comprising a plurality of web pages, a web page of the website comprising a field for customer entry of data representative of a term of insurance coverage for insuring content within the safe deposit box, the server being further configured to (1) provide the web page having the term field to the remote computer for display thereon, and (2) receive data representative of the term for the insurance policy via customer input through the term field of the provided web page.

42. The apparatus of claim 38 wherein the server is further configured to host a website, the website comprising a plurality of web pages, a web page of the website comprising a field for customer entry of data representative of the location, the server being further configured to (1) provide the web page having the location field to the remote computer for display thereon, and (2) receive data representative of the location via customer input through the location field of the provided web page.

43. The apparatus of claim 38 wherein the server is further configured to host a website, the website comprising a plurality of web pages, a web page of the website comprising a field for customer entry of data representative of an identifier for the safe deposit box within the entity in which the safe deposit box resides, the server being further configured to (1) provide the web page having the identifier field to the remote computer for display thereon, and (2) receive data representative of the identifier via customer input through the identifier field of the provided web page.

44. The apparatus of claim 38 wherein the insurance policy comprises a master insurance policy that insures content within a plurality of safe deposit boxes.

45. The apparatus of claim 38 wherein the a server is further configured to host a website, the website comprising a plurality of web pages, the server further configured provide at least one web page of the website to the remote computer for display thereon, the at least one web page comprising a plurality of fields for customer input, the fields comprising (1) a first field for receiving data representative of the location, (2) a second field for receiving data representative of the monetary amount, and (3) a third field for receiving data representative of a desired term of insurance coverage for insuring content within the safe deposit box, and wherein the server is further configured to receive data representative of the location, the monetary amount, and the term via the fields of the at least one web page.

46. The apparatus of claim 45 wherein the server is further configured to determine the premium for the insurance policy based on a plurality of parameters, the parameters being independent of any content for storage in the safe deposit box, and the parameters comprising at least two selected from the group consisting of: (1) data representative of the monetary amount, (2) data representative of the term, (3) safety data corresponding to an entity in which the safe deposit box resides, (4) data representative of a size for the safe deposit box, (5) data representative of the location, and (6) geographical data associated with the location, wherein the geographical data is indicative of a risk of a natural disaster at the location.

47. The apparatus of claim 45 wherein the server is further configured to determine whether to issue the insurance policy based on the received information.

48. The apparatus of claim 45 wherein the server is further configured to provide another web page of the website to the remote computer for display thereon, the another web page being the screen through which the communicated data is displayed on the remote computer.

49. The apparatus of claim 48 wherein the another web page comprises (1) a field that displays the determined premium, and (2) a field for the customer to input data indicative of an acceptance of the insurance policy corresponding to the determined premium.

50. The apparatus of claim 49 wherein the another web page further comprises a field for the customer to indicate data relating to payment information.

51. The apparatus of claim 49 wherein the server is further configured to determine the premium for the insurance policy based on a plurality of parameters, the parameters being independent of any content for storage in the safe deposit box, and the parameters comprising at least two selected from the group consisting of: (1) data representative of the monetary amount, (2) data representative of the term, (3) safety data corresponding to an entity in which the safe deposit box resides, (4) data representative of a size for the safe deposit box, (5) data representative of the location, and (6) geographical data associated with the location, wherein the geographical data is indicative of a risk of a natural disaster at the location.

52. The apparatus of claim 39 wherein the server is further configured to (1) host a website, the website comprising a plurality of web pages, and (2) provide a web page of the website to the remote computer for display thereon, the provided web page being the screen through which the communicated data is displayed on the remote computer.

53. The apparatus of claim 39 wherein the server is further configured to (1) host a website, the website comprising a plurality of web pages, and (2) provide at least one web page of the website to the remote computer for display thereon, the provided at least one web page being configured to solicit information from the customer regarding a desired term of insurance coverage for insuring content within the safe deposit box, wherein the received information further comprises data representative of the teen, and wherein the server is further configured to configure the insurance policy with the term.

54. The apparatus of claim 53 wherein the provided at least one web page is further configured to solicit information from the customer regarding a location for an entity in which the safe deposit box resides.

55. The apparatus of claim 54 wherein the provided at least one web page is further configured to solicit information from the customer regarding an identifier for the safe deposit box within the entity in which the safe deposit box resides, and wherein the received information further comprises data representative of the identifier.

56. The apparatus of claim 55 wherein the server is further configured to determine the premium based on a plurality of parameters, the parameters comprising at least two selected from the group consisting of: (1) data representative of the monetary amount, (2) data representative of the term, (3) safety data corresponding to the entity in which the safe deposit box resides, (4) data representative of a size for the safe deposit box, (5) the entity location data, and (6) geographical data associated with the entity location, wherein the geographical data is indicative of a risk of a natural disaster at the entity location.

57. The apparatus of claim 55 wherein the server is further configured to determine the premium based on a plurality of parameters, the parameters comprising at least three selected from the group consisting of: (1) data representative of the monetary amount, (2) data representative of the term, (3) safety data corresponding to the entity in which the safe deposit box resides, (4) data representative of a size for the safe deposit box, (5) the entity location data, and (6) geographical data associated with the entity location, wherein the geographical data is indicative of a risk of a natural disaster at the entity location.

58. The apparatus of claim 55 wherein the server is further configured to determine the premium based on a plurality of parameters, the parameters comprising at least four selected from the group consisting of: (1) data representative of the monetary amount, (2) data representative of the term, (3) safety data corresponding to the entity in which the safe deposit box resides, (4) data representative of a size for the safe deposit box, (5) the entity location data, and (6) geographical data associated with the entity location, wherein the geographical data is indicative of a risk of a natural disaster at the entity location.

59. The apparatus of claim 55 wherein the server is further configured to determine the premium based on a plurality of parameters, the parameters comprising at least five selected from the group consisting of: (1) data representative of the monetary amount, (2) data representative of the term, (3) safety data corresponding to the entity in which the safe deposit box resides, (4) data representative of a size for the safe deposit box, (5) the entity location data, and (6) geographical data associated with the entity location, wherein the geographical data is indicative of a risk of a natural disaster at the entity location.

60. The apparatus of claim 55 wherein the server is further configured to determine the premium based on a plurality of parameters, the parameters comprising: (1) data representative of the monetary amount, (2) data representative of the term, (3) safety data corresponding to the entity in which the safe deposit box resides, (4) data representative of a size for the safe deposit box, (5) the entity location data, and (6) geographical data associated with the entity location, wherein the geographical data is indicative of a risk of a natural disaster at the entity location.

61. The apparatus of claim 55 wherein the received information further comprises data representative of a desired deductible amount for the insurance policy, and wherein the server is further configured to determine the premium based on a plurality of parameters, at least one of the parameters comprising the deductible amount data.

62. The apparatus of claim 38 wherein the insurable event comprises at least one member of the group consisting of a theft, a fire, a flood, and an earthquake.

63. The apparatus of claim 38 wherein the server is further configured to (1) host a website, the website comprising a plurality of web pages, and (2) provide at least one web page of the website to the remote computer for display thereon, the provided web page providing a list of safe deposit box insurance policy options to the customer, and wherein the received information comprises a selection from the list by the customer.

64. The apparatus of claim 63 wherein the server is further configured to determine a premium for each of a plurality of safe deposit box insurance policy options, and wherein the generated list is configured to display the determined premium amounts for the safe deposit box insurance policy options.

65. The apparatus of claim 38 wherein the computer system is further configured to (1) receive a claim against the insurance policy, (2) determine whether an insurable event under the insurance policy has occurred with respect to the safe deposit box, (3) determine whether the customer has paid the all premiums due under the insurance policy, and, (4) in response to a determination that (i) an insurable event under the insurance policy has occurred with respect to the safe deposit box, and (ii) the customer has paid the all premiums due under the insurance policy, determine that the customer is to receive the monetary amount as a claim payment in accordance with the insurance policy, and wherein the computer system is further configured to perform the payment determination without a requirement for an appraisal of any content stored in the safe deposit box.

66. The apparatus of claim 65 wherein the insurable event comprises at least one member of the group consisting of a fire, a flood, and an earthquake, and wherein the computer system is further configured to perform the payment determination without requiring the customer to itemize or disclose any content stored in the safe deposit box.

67. The apparatus of claim 65 wherein the insurable event comprises a theft, and wherein the computer system is further configured to perform the payment determination without requiring the customer to itemize or disclose any content stored in the safe deposit box.

68. The apparatus of claim 65 wherein the computer system is further configured to (1) receive proof corresponding to the insurable event, and (2) determine whether the insurable event under the safe deposit box insurance policy has occurred with respect to the safe deposit box based on the received proof.

* * * * *